US009007930B2

(12) United States Patent
Furukawa

(10) Patent No.: US 9,007,930 B2
(45) Date of Patent: Apr. 14, 2015

(54) COMMUNICATION APPARATUS

(75) Inventor: Akihiro Furukawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 483 days.

(21) Appl. No.: 13/050,986

(22) Filed: Mar. 18, 2011

(65) Prior Publication Data

US 2011/0235535 A1   Sep. 29, 2011

(30) Foreign Application Priority Data

Mar. 26, 2010   (JP) ................................. 2010-073421

(51) Int. Cl.

| | |
|---|---|
| *H04L 12/26* | (2006.01) |
| *H04L 12/28* | (2006.01) |
| *G06F 1/00* | (2006.01) |
| *G06F 1/26* | (2006.01) |
| *G06F 3/12* | (2006.01) |
| *G06K 15/00* | (2006.01) |
| *G06F 1/32* | (2006.01) |
| *H04L 12/12* | (2006.01) |

(52) U.S. Cl.
CPC ............ *G06F 1/3284* (2013.01); *G06F 1/3203* (2013.01); *G06F 1/3209* (2013.01); *H04L 12/12* (2013.01); *Y02B 60/1267* (2013.01); *Y02B 60/34* (2013.01); *Y02B 60/32* (2013.01)

(58) Field of Classification Search
USPC .......................... 713/310, 320; 370/392, 463; 358/1.15–1.16
See application file for complete search history.

(56) References Cited

U.S. PATENT DOCUMENTS 7,843,953 B2   11/2010   Kawata et al.
2006/0236143 A1 *  10/2006   Kidoguchi ..................... 713/320

(Continued)

FOREIGN PATENT DOCUMENTS

| EP | 1458211 A1 * | 9/2004 | ............... H04Q 7/38 |
|---|---|---|---|
| JP | 2003-283588 A | 10/2003 | |
| JP | 2006-085561 A | 3/2006 | |

(Continued)

OTHER PUBLICATIONS

Postel, J., "User Datagram Protocol; rfc768", ISI, Aug. 28, 1980, pp. 1-3, XP015006747, ISSN: 0000-0003.
Braden, R., et al., "Requirements for Internet Hosts—Communication Layers; rfc1122", Internet Engineering Task Force, Oct. 1, 1989, XP015006065, ISSN: 0000-003.

(Continued)

*Primary Examiner* — Jung Park
*Assistant Examiner* — Chuong M Nguyen
(74) *Attorney, Agent, or Firm* — Merchant & Gould PC

(57) ABSTRACT

A communication apparatus including: a processing unit configured to transition between a first state and a second state and configured to perform a response process on a packet received via the network, wherein the processing unit includes: a determination unit configured to perform a first determination process; a verification unit configured to perform a first verification process for verifying the validity of the first packet, if it is determined as a first case; and a first responding unit configured to perform the response process on the first packet, if the first packet is verified as valid, wherein if it is determined as a second case that the first packet is not the packet of which the response process is to be performed by the processing unit, the verification unit dose not perform the first verification process and the first responding unit does not perform the response process.

8 Claims, 11 Drawing Sheets

(56) References Cited

U.S. PATENT DOCUMENTS

| 2007/0211725 | A1* | 9/2007 | Kawata et al. | 370/392 |
| 2009/0119522 | A1* | 5/2009 | Satoh | 713/320 |
| 2009/0323120 | A1* | 12/2009 | Yamanaka | 358/1.16 |
| 2010/0007914 | A1* | 1/2010 | Watanabe | 358/1.15 |
| 2010/0293400 | A1* | 11/2010 | Kuroishi et al. | 713/310 |

FOREIGN PATENT DOCUMENTS

| JP | 2006-259906 A | 9/2006 |
| JP | 2007-243595 A | 9/2007 |
| JP | 2010-006007 A | 1/2010 |

OTHER PUBLICATIONS

European Patent Office, extended European Search Report for European Patent Application No. 11158124.5 (counterpart European patent application), dated Aug. 17, 2012.

Japan Patent Office, Notification of Reasons for Refusal for Japanese Patent Application No. 2010-073421 (counterpart to above-captioned patent application), issued Jul. 3, 2012.

Japan Patent Office, Notification of Reason for Refusal for Japanese Patent Application No. 2010-073421 (counterpart Japanese patent application), dispatched Nov. 13, 2012.

* cited by examiner

FIG. 3

| | MAIN CPU (20) | SUB CPU (30) | SRAM (60) | SDRAM (100) | DISPLAY PANEL (122) | ENGINE CONTROL-CIRCUIT (110) PANEL CONTROL-CIRCUIT (120) |
|---|---|---|---|---|---|---|
| PROCESSING STATE | CLOCK SUPPLY | CLOCK SUPPLY | NORMAL OPERATION MODE | NORMAL OPERATION MODE | ON | CLOCK SUPPLY |
| STANDBY STATE | CLOCK SUPPLY | CLOCK SUPPLY | NORMAL OPERATION MODE | NORMAL OPERATION MODE | ON | CLOCK SUPPLY |
| L SLEEP STATE | CLOCK SUPPLY | CLOCK SUPPLY | NORMAL OPERATION MODE | NORMAL OPERATION MODE | OFF | STOP CLOCK SUPPLY |
| D SLEEP STATE | STOP CLOCK SUPPLY | CLOCK SUPPLY | NORMAL OPERATION MODE | SELF-REFRESH MODE | OFF | STOP CLOCK SUPPLY |

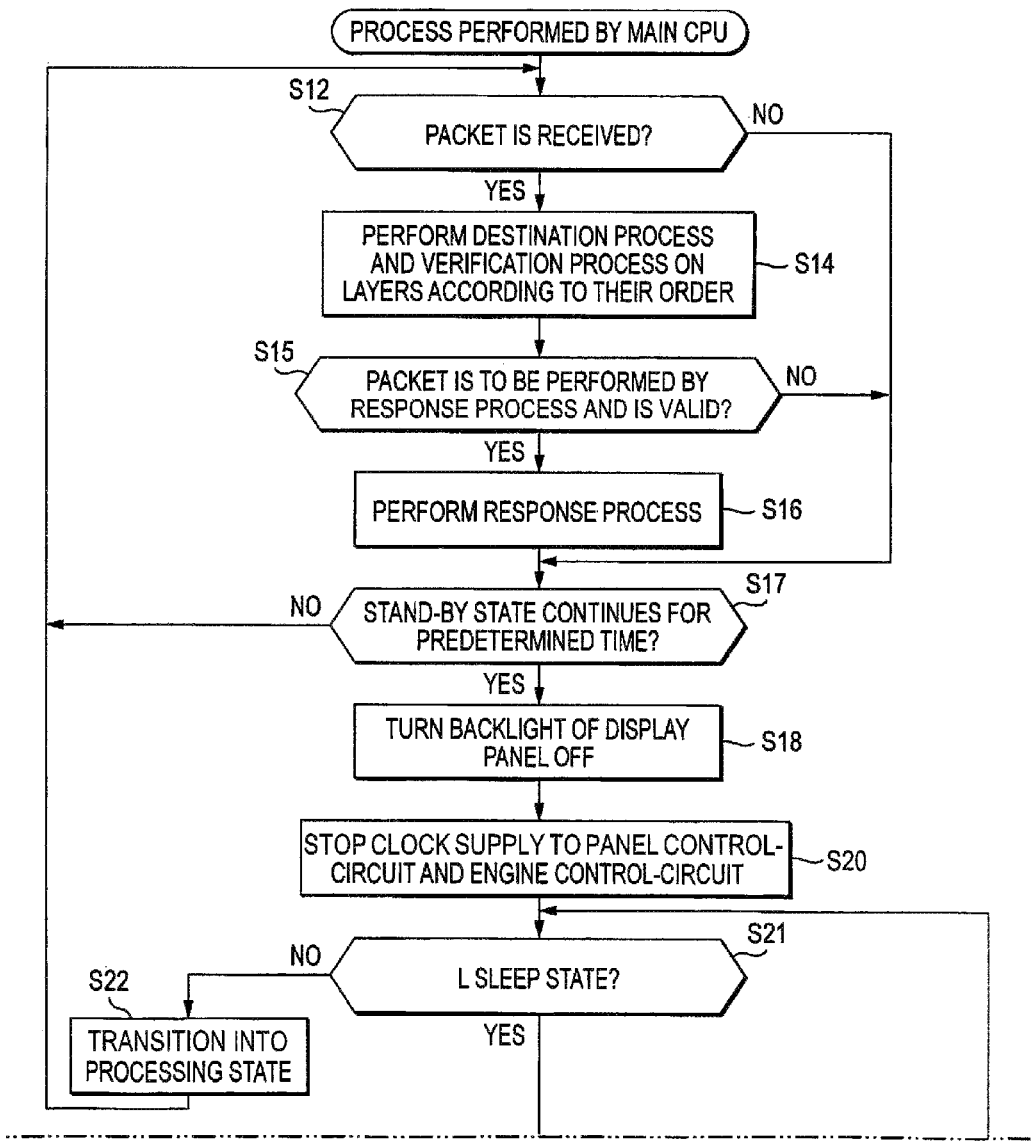

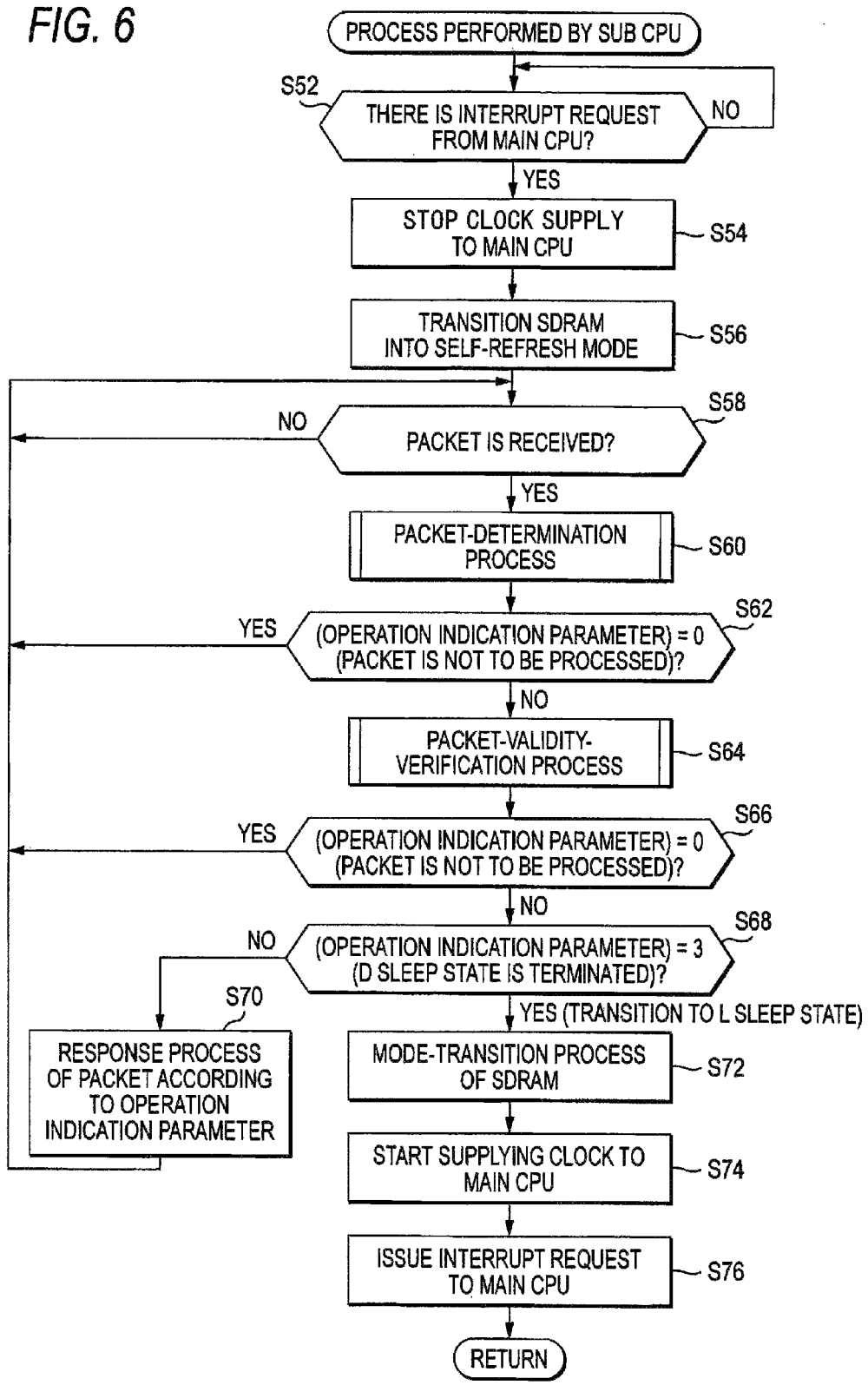

COMMUNICATION APPARATUS

CROSS-REFERENCE TO RELATED APPLICATION

This application claims priority from Japanese Patent Application No. 2010-073421 filed on Mar. 26, 2010, the entire subject matter of which is incorporated herein by reference.

BACKGROUND

1. Technical Field

The present invention relates to a communication apparatus that is to be connected to a network.

2. Background

The related art discloses an image processing apparatus having a main CPU and a sub CPU. The operation state of the image processing apparatus transitions between a normal state, in which power supply to the main CPU is performed, and an energy-save state, in which power supply to the main CPU is interrupted. When the image processing apparatus receives a packet via a network during the power save state, the sub CPU determines whether or not the packet is to be discarded based on packet information about its IP version and a header length. If the packet is determined that the packet is not to be discarded, the sub CPU further determines whether or not the packet is to be responded by an image processing apparatus. If the determination is YES, the main CPU or the sub CPU performs a response process on the packet.

SUMMARY

There is a need for further reducing a power consumption of a communication apparatus (an image processing apparatus of one related art). The present invention provides a technology that is capable of reducing a power consumption of a communication apparatus.

An aspect of the present invention relates to a communication apparatus that is to be connected to a network. The communication apparatus includes a processing unit that transitions between a first state, in which the power consumption is relatively high, and a second state, in which the power consumption is relatively low. The processing unit performs a response process on a packet received via a network. The processing unit includes a determination unit, a verification unit, and a first responding unit. The determination unit performs, while the processing unit is in the second state, a first determination process for determining whether or not a first packet received via a network is a packet of which the response process is to be performed by the processing unit. If it is determined as a first case that the first packet is a packet of which the response process is to be performed by the processing unit, the verification unit performs a first verification process for verifying the validity of the first packet after the first determination process. If the first packet is verified as valid, the first responding unit performs the response process on the first packet. If it is determined as a second case that the first packet is not a packet of which the response process to be performed by the processing unit, the verification unit does not perform the first verification process and the first responding unit does not perform the response process.

In the related art, before the response process is performed, a verification process for verifying the validity of the received packet is also performed at same time that a process for determining whether or not the received packet is a packet that is to be performed by a response process. Accordingly, in a process in the related art, the verification process is also performed even when it is determined that there is no need to perform the response process on the received packet. In contrast, in the communication apparatus of the present invention, if the first packet is received while the processing unit is in the second state, the first determination process is performed and then the first verification process is performed. Further, if the first determination process determines that the first packet is a packet of which the response process is not to be performed, the first verification process is not performed. Accordingly, when the processing unit is in the second state, a processing load of the processing unit can be lowered, and the power consumption of the communication apparatus can be reduced.

The determination unit may perform the first determination process using information, which is to be processed on a first layer, of the first packet. After the first determination process, the verification unit may perform the first verification process using information, which is to be processed on a second layer that is lower than the first layer, of the first packet. In the general process, the process, which is including the determination process and the verification process, is first performed using the information of the received packet to be processed on a lower layer, and then the process, which is including the determination process and the verification process, is performed using the information of the received packet to be processed on a upper layer. In contrast, in this communication apparatus, before the first verification process is performed using the information that is to be processed in the lower layer (the second layer), the first determination process is performed using the information that is to be processed in the upper layer (the first layer). Thus, when the first packet is determined as a packet of which the response process is to be performed while the processing unit is in the second state, the first verification process may not be performed using the information that is to be processed in the lower layer (the second layer).

The determination unit may perform the first determination process using a destination IP address included in an IP header of the first packet and a destination port number included in an UDP header of the first packet. After the first determination process, the verification unit may perform the first verification process using specific information included in the IP header of the first packet. In the meantime, the specific information included in the IP header includes at least one of error detecting information, data size information, and a source IP address.

The determination unit may also perform the first determination process using information included in application data of the first packet. After the first determination process, the verification unit may perform the first verification process using specific information included in the UDP header of the first packet. In the meantime, the specific information included in the UDP header may include error detecting information.

The processing unit may also include a packet analysis unit and a second responding unit. While the processing unit is in the first state, the packet analysis unit may perform a second determination process for determining whether or not a second packet received via a network is a packet of which the response process is to be performed by the processing unit, and may perform a second verification process for verifying the validity of the second packet when the second determination process is performed. When the second packet is determined as a packet of which the response process is to be performed by the processing unit and the second packet is verified as valid, the second responding unit may perform the response process on the second packet. In this exemplary configuration, the second packet received, while the processing unit is in the first state, may be processed in a suitable manner in similar to the general process.

The packet analysis unit may perform the second verification process using the information of the second packet that is to be processed on a third layer, and then The packet analysis unit may performs the second verification process using the information that is to be processed on a fourth layer that is upper than the third layer.

The processing unit may include a first processing unit and a second processing unit. The first processing unit may transition between a sleep state and a non-sleep state. In the non-sleep state, the first processing unit may perform the response process. The first processing unit may be in the non-sleep state while the processing unit is in the first state, and the first processing unit may be in the sleep state while the processing unit is in the second state. The second processing unit may include a determination unit, a verification unit, and a first responding unit. The second processing unit may perform the response process while the first processing unit is in the sleep state. The determination unit may further determine whether or not the first processing unit is to be transitioned from the sleep state into the non-sleep state in the first case. The first responding unit may perform the response process on the first packet if it is determined that the first processing unit is not to be transitioned from the sleep state into the non-sleep state. The second processing unit may transition the first processing unit from the sleep state to the non-sleep state if it is determined that the first processing unit is to be transitioned from the sleep state into the non-sleep state. The first processing unit may perform the response process on the first packet after the transition into the non-sleep state. In this configuration, if it is determined that the first processing unit is not to be transitioned from the sleep state into the non-sleep state, the second processing unit may perform the response process on the first packet while the first processing unit maintains the sleep state. Since the first processing unit is maintained in the sleep state, the power consumption of the communication apparatus can be lowered. Further, in the communication apparatus, when the determination unit determines that the first processing unit is to be transitioned into the non-sleep state, first processing unit is transitioned into the non-sleep state, and the first processing unit performs the response process on the first packet. According to this configuration, the response process to the first packet can be performed in a suitable manner.

The communication apparatus may include an integrated circuit including the processing unit, a first memory provided inside of the integrated circuit, and a second memory provided outside of the integrated memory. The determination unit may perform the first determination process according to a first program stored in the first memory. The verification unit may perform the first verification process according to a second program stored in the second memory. According to this configuration, compared to a configuration in which both the first memory and the second memory are provided in the integrated circuit, the memory in the integrated circuit (i.e. the first memory) can be made smaller. Further, as described above, in the communication apparatus, if the first determination process determines that the first packet is not a packet that is to be performed by the responding process by the processing unit, the first verification process is not performed. Accordingly, the frequency, which the processing unit accesses to the second memory outside the integrated circuit in which the second program for performing the first verification process is stored, may be reduced.

Additionally, a control method and a computer program for achieving the communication apparatus according to aspects of the present invention may be useful and novel.

BRIEF DESCRIPTION OF DRAWINGS

FIG. 3 is a view showing an example of states of the respective units according to the states of the printer;

FIGS. 5A to 5B are views showing a flow chart of a process performed by a main CPU;

FIG. 6 is a view showing a flow chart of a process performed by a sub CPU;

DETAILED DESCRIPTION

Figure 1:
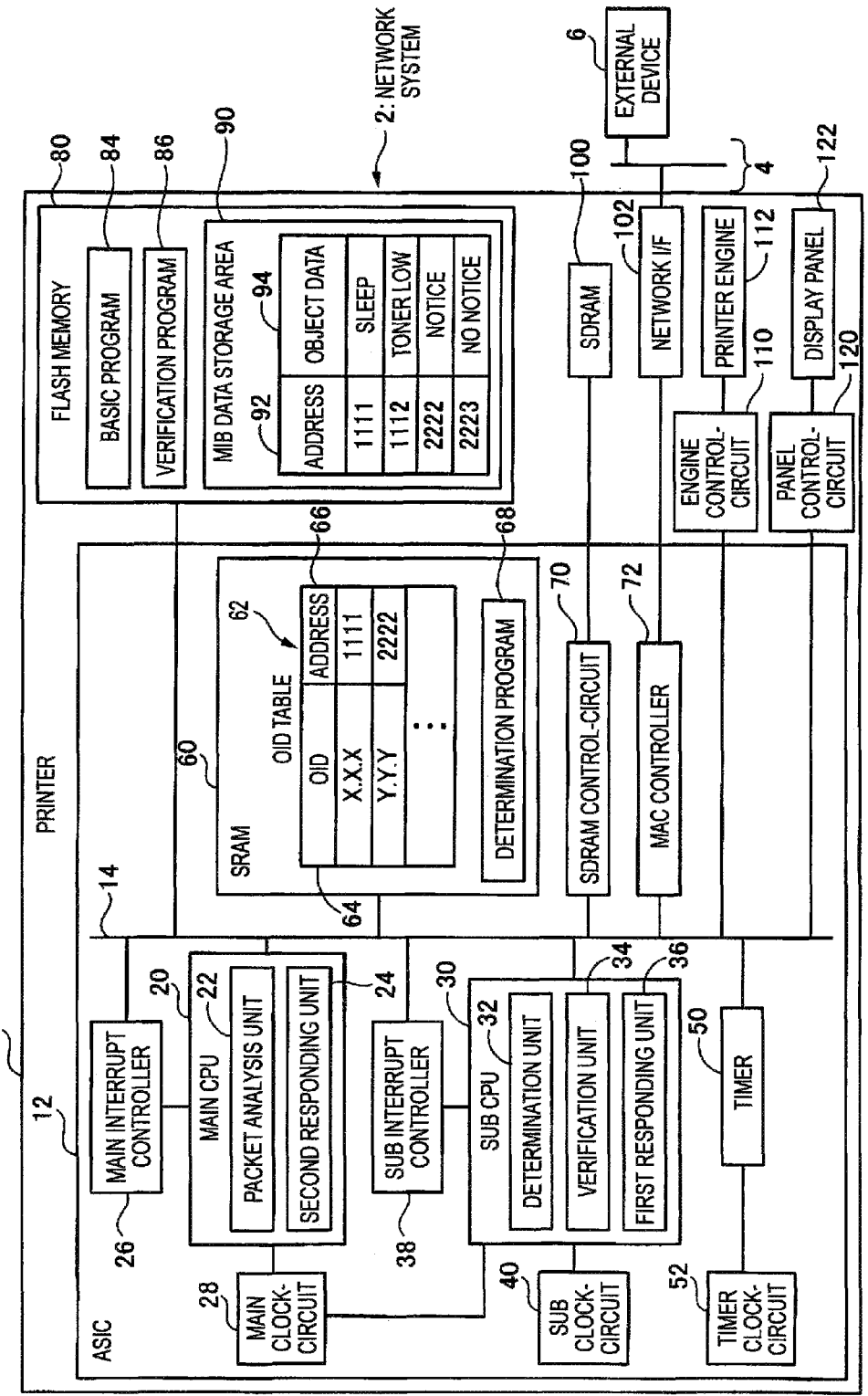
FIG. 1 is a view showing a configuration of a network system.

Hereinafter, exemplary aspects of the present invention will be described with reference to the accompanying drawings. As shown in FIG. 1, a network system 2 includes an external device 6 such as PCs, and a printer 10. The external device 6 and the printer 10 are communicable via a LAN 4 with each other.

(Configuration of the Printer)

As shown in FIG. 1, the printer includes an Application Specific Integrated Circuit (ASIC) 12, a flash memory 80, an SDRAM 100, a network interface 102, an engine control-circuit 110, a printer engine 112, a panel control-circuit 120, and a display panel 122.

The ASIC 12 includes a main CPU 20, a main interrupt controller 26, a main clock-circuit 28, a sub CPU 30, a sub interrupt controller 38, a sub clock-circuit 40, a timer 50, a timer clock-circuit 52, a SRAM 60, a SDRAM control-circuit 70, and a MAC controller 72. The respective elements 20, 26, 30, 38, 50, 60, 70, and 72 are connected to a bus 14.

The main CPU 20 performs a variety processes according to basic programs 84 stored in the flash memory 80. Thus, functions of a packet analysis unit 22 and a second responding unit 24 are achieved. The main clock-circuit 28 supplies a clock signal to the main CPU 20. While the clock signal is being supplied to the main CPU 20, the main CPU is in a non-sleep state. While the clock signal is not being supplied to the main CPU, the main CPU is in a sleep state. Compared to the non-sleep state of the main CPU 20, the sleep state of the main CPU 20 has lower power consumption. The main clock-circuit 28 is controlled by the sub CPU 30. The main interrupt controller 26 supplies an interrupt-request signal, which is acquired from an external device of the main CPU 20 (e.g. the sub CPU 30, the timer 50, and the MAC controller 72), to the main CPU 20. When the interrupt-request signal is acquired from the main interrupt controller 26, the main CPU 20 performs a process according to the interrupt-request signal.

The sub CPU 30 performs a variety of processes according to respective programs 68, 84, and 86 that are stored in the respective memories 60 and 80. Accordingly, functions of a determination unit 32, a verification unit 34, and a first responding unit 36 are achieved. The sub clock-circuit 40 supplies a clock signal to the sub CPU 30. The frequency of the clock signal of the sub clock-circuit 40 is lower than that of the main clock-circuit 28. Thus, compared to the power consumption for driving the main CPU 20, the power consumption for driving the sub CPU 30 is lower. Further, a processing rate of the main CPU 20 is higher than that of the sub CPU 30. The sub clock-circuit 40 supplies a clock signal to the sub CPU 30 while the printer 10 is turned ON and stops supplying the clock signal thereto when the printer 10 is turned OFF. That is, the sub CPU 30 is maintained in a state in which the clock signal is being supplied (a non-sleep state) while the printer 10 is in a power-ON state. The sub interrupt controller 38 supplies an interrupt-request signal, which is acquired from an external device of the sub CPU 30 (e.g. the main CPU 20 and the MAC controller 72), to the sub CPU 30. When supplied with the interrupt-request signal from the sub interrupt controller 38, the sub CPU 30 performs a process according to the interrupt-request signal.

The timer 50 performs counting-down from a predetermined initial value in synchronization with a clock signal supplied from the timer clock-circuit 52.

When the printer 10 is transitioned from a processing state 302 into a stand-by state 302 (See FIG. 2), the timer clock-circuit 52 starts supplying a clock signal to the timer 50. When the counted value becomes 0 (zero), the timer 50 supplies a timer interrupt-request signal to the main interrupt controller 26. As a result, the main interrupt controller 26 supplies the timer interrupt-request signal to the main CPU 20, and the main CPU transitions the printer 10 from the stand-by state 304 into an L sleep state 306 (See FIG. 2).

The SRAM 60 is accessible from the respective CPUs 20 and 30. The sub CPU 30 stores a packet received via a LAN 4 in the SRAM while the main CPU 20 is in the sleep state. The SRAM 60 stores Object ID (OID) Table (to be described later) therein. The SRAM 60 additionally stores a packet-determination program 68, which is performed by the sub CPU 30 for a packet-determination process (see FIG. 7). The packet-determination program 68 is stored in the flash memory 80 in a compressed state. When the printer 10 is turned ON, the main CPU 20 uncompresses the compressed packet-determination program 68 in the flash memory 80, and stores the uncompressed packet-determination program 68 in the SRAM 60.

The SDRAM control-circuit 70 accesses to the SDRAM 100 according to instructions from the respective CPUs 20 and 30. Further, the SDRAM control-circuit 70 supplies or stops supplying a clock signal to the SDRAM 100 according to an instruction from the sub CPU 30 so as to transition of the SDRAM 100 between a normal operation mode having a relatively high power consumption and a self-refresh mode having a relatively low power consumption.

The MAC controller 72 is connected to the network interface 102. When a packet is received from the network interface 102 via the LAN 4, the MAC controller 72 supplies a packet interrupt-request signal to any one of two interrupt controllers 26 and 38. Specifically, when a packet is received while the main CPU 20 is in the non-sleep state, the MAC controller 72 supplies the packet interrupt-request signal to the main interrupt controller 26. In the meantime, when the packet is received while the main CPU 20 is in the sleep state, the MAC controller 72 supplies the packet interrupt-request signal to the sub interrupt controller 38.

The flash memory 80 is provided outside of the ASIC 12. The flash memory 80 is accessible from the respective CPUs 20 and 30. Meanwhile, when there is no access from the respective CPUs 20 and 30, the flash memory 80 is maintained in lower power consumption as compared to the case of being accessed. Thus, power saving of the flash memory 80 is achieved. The flash memory 80 stores a variety of programs to be executed by the respective CPUs 20 and 30 therein. The programs include a basic program 84, a verification program 86, and determination program 68. The respective programs 84 and 86 are used by the respective CPUs 20 and 30 while they are being stored in the flash memory 80. However, as described above, the determination program 68 is used by the sub CPU 30 while it is being stored in the SRAM 60. Meanwhile, the flash memory 80 includes a Management Information Base (MIB) data storage area 90 (to be described later).

The SDRAM 100 is accessible from the main CPU 20. The main CPU 20 stores a packet received via the LAN 4 in the SDRAM 100 while it is in the non-sleep state. The SDRAM 100 has a total storage capacity that is larger than the SRAM 60. Thus, the power consumption of the SDRAM 100 is higher than that of the SRAM 60. The SDRAM 100 is controlled by the SDRAM control-circuit 70 so that the SDRAM transitions between a normal operation mode and a self-refresh mode. The SDRAM 100 stored information that is required for the main CPU 20 to perform a process therein. For example, the information includes an IP address, a MAC address, a node name, and the like of the printer 10. The SDRAM 100 additionally stores an object data table (will be described later) in which the plurality of OIDs and object data corresponding with each other are registered therein. The object data is information indicating the current status of the printer 10.

Here, it will be described about the OID Table 62 stored in the SRAM 60, the MIB data storage area 90 in the flash memory 80, and the object data table stored in the SDRAM 100. The main CPU 20 registers the object data that correspond to the respective OIDs in object data table when the printer 10 is turned ON. Meanwhile, the plurality of OIDs is previously registered by a vender of the printer 10. For example, if unused capacity of toner in the printer 10 is lower than a predetermined amount of toner, the main CPU 20 registers "TONER LOW" in correspondence with OID "X.X.X". When the status of the printer 10 is changed (e.g. if toner is replaced), the main CPU 20 changes object data in the object data table. When performing a response process on a request packet received via the LAN 4 and requests the object data of the printer 10, the main CPU 20 acquires the object data corresponding to OID designated by the request packet, from the object data table in the SDRAM 100. Subsequently, the main CPU 20 transmits a response packet in which the OID and the object data acquired are corresponding with each other to a source device (e.g. an external device 6).

In the OID Table 62 in the SRAM 60, the OID 64 and an address 66 are registered with a correspondence manner. The OID 64 is previously registered by a vender of the printer 10. The OID 64 only corresponds to some OIDs among the plurality of OIDs in the object data table. That is, in the object data table in the SDRAM 100, some OIDs that do not correspond to the OID 64 are included. In the MIB data storage area 90, the plurality of object data 94 is stored. The respective object data 94 is specified by an address 92. When transitioned from the non-sleep state to the sleep state, the main CPU 20 registers addresses 66 that correspond to the respective OIDs 64 with reference to the object data table. Specifically, the main CPU 20 acquires the object data (e.g. "NOTICE" or "NO NOTICE") that correspond to the OIDs that are identical to the respective OIDs 64 (e.g. OID "Y.Y.Y"), from the object data table. Subsequently, the main CPU 20 specifies the address 92 (e.g. address "2222") of the object data that is identical to the acquired object data (e.g. "NOTICE") from the MIB data storage area 90. Then, the main CPU 20 registers the specified address 92 as an address 66 corresponding to the OID 64 (e.g. OID "Y.Y.Y") in the OID Table 62.

When performing the response process on the request packet, the sub CPU 30 acquires an address 66 (e.g. address "2222") corresponding to the OID (e.g. OID "Y.Y.Y") specified by the request packet, from the OID Table 62. Subsequently, the sub CPU 30 acquires object data 94 (e.g. "NOTICE"), which is specified by the acquired address 66, from the MIB data storage area 90. The sub CPU 30 transmits a response packet, in which the OID and the acquired object data are corresponded with each other, to a source device (e.g. the external device 6) of the request packet.

The network interface 102 is connected to the LAN 4. The network interface 102 supplies a packet received via the LAN 4 to the MAC controller 72. The engine control-circuit 110 controls the printer engine 112, such as ink-jet type, laser type, or the like, according to an instruction from the main CPU 20. The panel control-circuit 120 controls the display panel 122 according to an instruction from the main CPU 20. The display panel 122 is an LCD. The panel control-circuit 120 transitions a backlight of the display panel 122 between ON state and OFF state. The respective control-circuits 110 and 120 are supplied with a clock signal from a clock-circuit, which is not shown in the drawings. While the clock signal is supplying to the respective control-circuits 110 and 120, the respective control-circuits 110 and 120 are in an operating state. When the supplying the clock signal supplied to the respective control-circuits 110 and 120 is stopped, the respective control-circuits 110 and 120 transitions into a stopped state. Thus, the power consumption of the respective control-circuits 110 and 120 can be lowered. The clock-circuit for the respective control-circuits 110 and 120 is controlled by the main CPU 20.

(Status Transition of the Printer)

Figure 2:
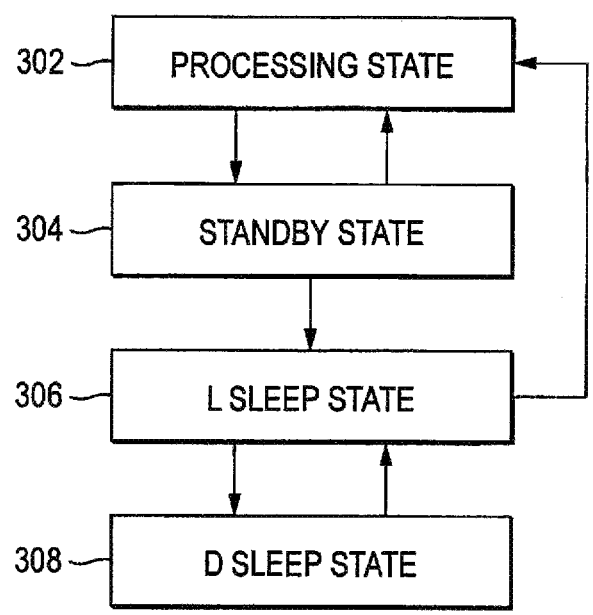
FIG. 2 is a view showing an example of state transitions in the printer.

As shown in FIG. 2, the state of the printer 10 transitions between a processing state 302, a stand-by state 304, an L sleep state 306, and a D sleep state 308. FIG. 3 shows the states of the two CPUs 20 and 30, the two RAMs 60 and 100, the display panel 122, and the two control-circuits 110 and 120 when the printer 10 is in the respective operation states 302 to 308. When the printer 10 is turned ON, the printer 10 becomes into the stand-by state 304. As shown in FIG. 3, in the stand-by state 304, the clocks are supplied to the two CPUs 20 and 30. That is, in the stand-by state 304, the two CPUs 20 and 30 are in the non-sleep state. Further, in the stand-by state 304, the two RAMs 60 and 100 are in the normal operation mode, the display panel 122 is in the ON state, and the two control-circuits 110 and 120 are supplied with the clock.

When the printer 10 is in the stand-by state 304 and a normal process is to be executed, the printer 10 transitions into the processing state 302. Meanwhile, the normal process includes a print process executed according to the printing packets, a display process executed when the display panel 122 is manipulated by a user, or the like. As shown in FIG. 3, in the processing state 302, the states of the respective elements 20, 30, etc. are the same as the stand-by state 304. A difference between the processing state 302 and the stand-by state 304 is whether or not the main CPU 20 executes the normal process. When the main CPU 20 completes the normal process, the printer 10 transitions into the stand-by state 304.

When the printer transitions into the stand-by state 304, the timer 50 performs counting-down its value from an initial value. When the counted value of the timer 50 becomes "0", the timer 50 supplies a timer interrupt-request signal to the main CPU 20 via the main interrupt controller 26. As a result, the main CPU 20 instructions the panel control-circuit 120 to turn the backlight of the display panel 122 into OFF state. Further, to stop supplying the clock signal to the engine control-circuit 110 and the panel control-circuit 120, the main CPU 20 instructions the clock-circuit for the two control-circuits 110 and 120. Then, the printer 10 transitions into the L sleep state 306. In the L sleep state, the two CPUs 20 and 30 are in the non-sleep state, the two RAMs are in the normal operation mode, the backlight of the display panel 122 is in the turned-OFF state, and the two control-circuits 110 and 120 are in the stopped state. Thus, the power consumption of the two control-circuits 110, 120 and the display panel 122 is lowered. In the L sleep state 306, when the above-mentioned normal process (the printing process, the display process, etc) is to be performed by the main CPU 20, the printer 10 transitions into the processing state 302. Here, the main CPU 20 supplies an instruction to the timer 50, for resetting the counted value of the timer 50 to an initial value. When the processing state 302 is completed and the operation mode transitions again into the stand-by state 304, the timer 50 performs counting-down its counted value again from the initial value.

Figure 5B:
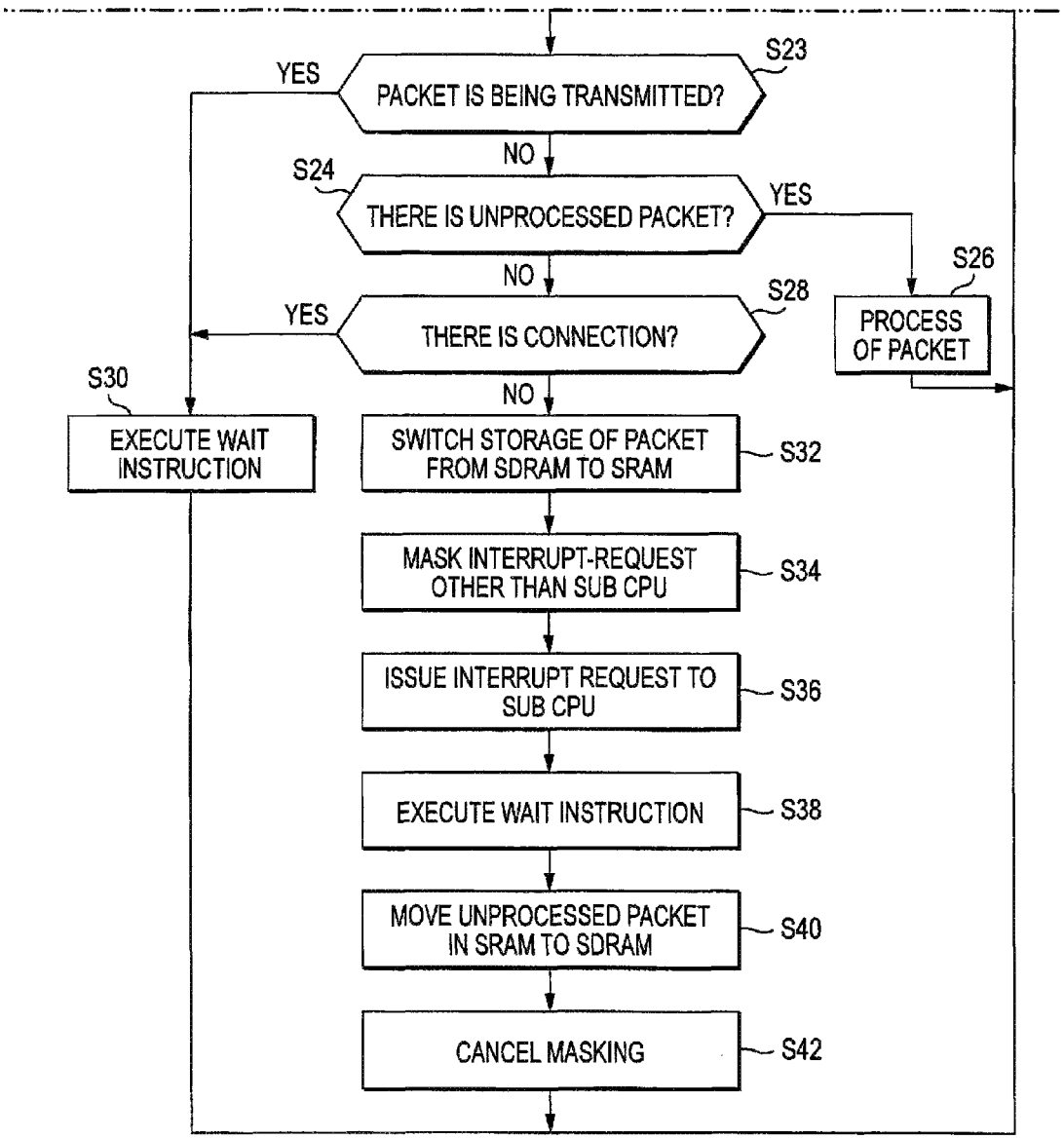

When the main CPU 20 performs the process of FIG. 5, the printer 10 transitions from the L sleep state 306 into the D sleep state 308. In the D sleep state 308, the main CPU 20 is in the sleep state, the sub CPU is in the non-sleep state, the SRAM 60 is in the normal operation mode, the SDRAM 100 is in a self-refresh mode, the backlight of the display panel 122 is in the turned-OFF state, and the two control-circuits 110 and 120 are in the stopped state. In the D sleep state 308, when the above-mentioned normal process (the printing process, the display process, etc.) is to be performed by the main CPU 20, the printer 10 is transitions into the processing state 302 via the L sleep state 306. Further, when the response process is to be performed by the main CPU 20 on the packet received during the D sleep state 308, the printer 10 transitions into the L sleep state 306.

(Configuration of Packet Received by Printer)

Figure 4:
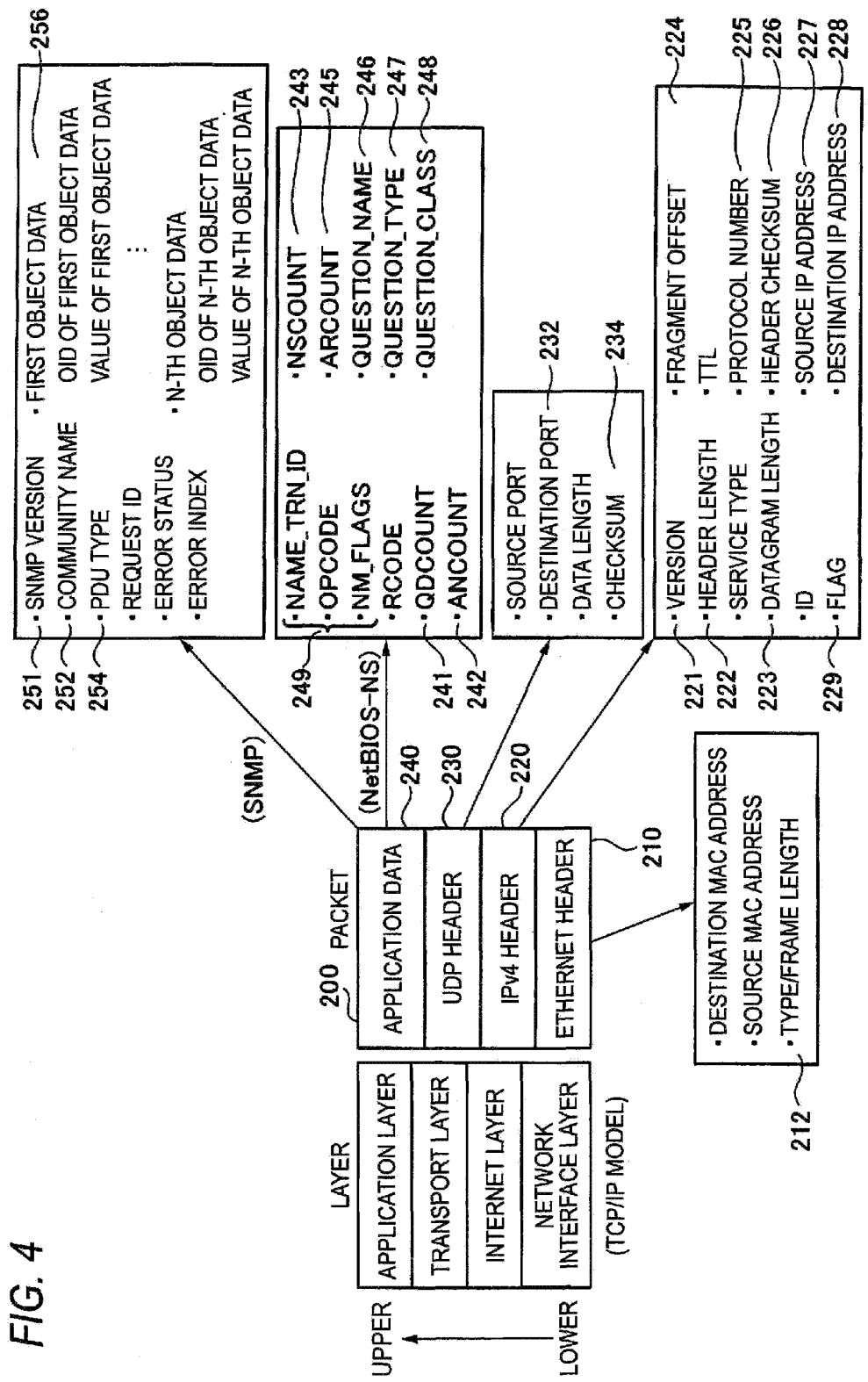
FIG. 4 is a view showing an exemplary packet received by the printer.

An exemplary configuration of a packet that is received by the printer 10 via the LAN 4 will be described. As shown in FIG. 4, a packet 200 that is one of examples is either a Network Basic Input-Output System Name-Service (Net-BIOS-NS) or a Simple Network Management Protocol (SNMP). The packet 200 includes an Ethernet (registered-trademark) header 210, an IPv4 header 220, a User Datagram Protocol (UDP) header 230, and an application data 240. Respective information (e.g. type/frame length 212, etc.) in the Ethernet header 210 is the information, which is to be processed on a network interface layer that is a lowest layer of a TCP/IP model. Respective information (e.g. a version 221, a header length 222, etc.) in the IPv4 header 220 is the information, which is to be processed on an internet layer that is one level upper than the network interface layer. Respective information (e.g. a destination port 232, checksum 234, etc.) in the UDP header 230 is the information, which is to be processed on a transport layer that is one level upper than the internet layer. Respective information in the application data 240 is the information, which is to be processed on an application layer that is one level upper than the transport layer. In the meantime, the application layer is a highest layer of the TCP/IP model.

Whether a packet 200 is a packet of either the NetBIOS-NS or the SNMP, contents of the information in the application data 240 are different from each other. For example, when the packet is a packet of the NetBIOS-NS, the application data 240 includes QDCOUNT 241, ANCOUNT 242, etc. When the packet is a packet of the SNMP, the application data 240 includes an SNMP version 251, a community name 252, etc.

(Process Performed by the Main CPU)

The detail of a process performed by the main CPU 20 will be described. When the printer 10 is turned ON, the main CPU 20 performs the process of FIG. 5 according to the basic program 84 in the flash memory 80. When the printer 10 is turned ON, the printer 10 is in the stand-by state 304. That is, when the printer 10 is turned ON, the timer clock-circuit 52 supplies a clock signal to the timer 50.

The main CPU 20 monitors receiving a packet (step S12). Specifically, the main CPU 20 monitors supplying the packet interrupt-request signal from the MAC controller 72 via the main interrupt controller 26. If the monitoring result is YES, the process proceeds to step S14, and if the monitoring result is NO, the process proceeds to step S17. In the meantime, the determination in step S14 is YES, the main CPU 20 stores the packet, which is received in step S12, in the SDRAM 100.

The processing of step S14 will be described with one example that the packet received in step S14 is the packet 200 of FIG. 4. The packet analysis unit 22 first specifies a protocol of a header that is to be processed on the internet layer using the Ethernet (registered trademark) header 210 that is to be processed on the network interface layer, which is a lowest layer in TCP/IP model. Then, the packet analysis unit 22 performs a process including an IPv4 header-determination process and an IPv4 header-verification process using the IPv4 header 220 that is to be processed on the internet layer. The IPv4 header-determination process includes a process of determining whether or not the packet 200 is a packet that is to be processed by the printer 10 using the destination IP address 228 included in the IPv4 header 220. For example, if the destination IP address 228 is any one of three IP addresses including an IP address, a broadcast address, and a multi-cast address of the printer 10, the packet analysis unit 22 determines that the packet 200 is a packet that is to be processed by the printer 10. If the destination IP address 228 is not any one of three IP addresses (e.g. if the destination IP address 228 is an IP address of other device), the packet analysis unit 22 determines that the packet 200 is not a packet that is to be processed with the response process by the printer 10. The IPv4 header-verification process includes a process of verifying whether or not the packet 200 is valid (normal) using the header length 222, a datagram length 223, and header checksum 226.

If the packet 200 is determined as a packet that is to be processed by the printer 10 and also the packet 200 is verified as valid in the IPv4 header-verification process, the packet analysis unit 22 performs a process including an UDP header-determination process and a UDP header-verification process using the UDP header 230 that is to be processed on the transport layer. The UDP header-determination process includes a process of determining whether or not the packet 200 is the packet that is to be processed by the printer 10 using the destination port 232 included in the UDP header 230. For example, if the destination port 232 is not within a certain range of port number, the packet 200 is determined as a packet that is not to be processed by the printer 10. The UDP header-verification process includes a process of verifying whether or not the packet 200 is valid using the checksum 234.

If the packet 200 is determined as a packet that is to be processed by the printer 10 and the packet 200 is also verified as valid in the UDP header-verification process, the packet analysis unit 22 performs the response process on the packet 200 using the application data 240 that is to be processed on the application layer. In the meantime, when the packet 200 is the packet of NetBIOS-NS, the packet analysis unit 22 performs a process of verifying whether or not the packet 200 is valid using QUESTION_NAME 246.

According to the above description, the packet analysis unit 22 performs the determination process for determining whether or not the packet 200 is a packet that is to be processed by the printer 10 and a verification process for verifying whether or not the packet 200 is valid using the information (i.e. the IPv4 header 220) that is to be processed on a lower layer (i.e. the internet layer), in the packet 200 that is received via the LAN 4 while the main CPU 20 is in the non-sleep state. Then, the packet analysis unit performs a process including a determination process and a verification process using the information (i.e. the UDP header 230) that is to be processed in the upper layer (i.e. the transport layer).

Subsequently, the main CPU 20 determines whether or not the packet, which is received in step S12 and has been determined as a packet that is to be processed by the printer 10, has been verified as valid (step S15). Here, if the determination is NO, the main CPU 20 deletes the packet received in step S12 and proceeds to step S17. In the meantime, if the determination in step S15 is YES, the second responding unit 24 performs the response process on the packet received in step S12 (step S16). For example, if the packet received in step S12 is a request packet of object data, the main CPU 20 transmits a response packet, which includes the object data that are registered in correspondence with the OIDs included in the packet in the object data stored in the SDRAM 100, to a source device of the packet received in step S12.

In step S17, the main CPU 20 determines whether or not the stand-by state 304 of the printer 10 continues for a predetermined time. Specifically, the main CPU 20 determines whether or not the timer interrupt request-signal is supplied from the timer 50 via the main interrupt controller 26. Here, if the determination is YES, the process proceeds to step S18, and if the determination is NO, a process returns to step S12. In step S18, the main CPU 20 instructions the panel control-circuit 120 to turn the backlight of the display panel 122 into OFF state. Then, the main CPU 20 stops supplying a clock signal to the engine control-circuit 110 and the panel control-circuit 120 (step S20). Accordingly, the printer 10 transitions into the L sleep state 306.

Subsequently, the main CPU 20 determines whether or not the printer 10 is in the L sleep state 306 (step S21). Specifically, if the counted value of the timer 50 indicates "0", the main CPU 20 determines that the printer 10 is in the L sleep state 306. If the counted value of the timer 50 indicates a value other than "0", the main CPU 20 determines that the printer 10 is not in the L sleep state. If the determination in step S21 is NO, the main CPU 20 transitions the printer 10 to the processing state 302 (i.e. to turn the backlight of the display panel 1220N and supply a clock signal to the respective control-circuits 110 and 120) and the process returns to step S12.

If the determination in step S21 is YES, the main CPU 20 determines whether or not the state is in a state transmitting a packet from the printer 10 (step S23). For example, while the main CPU 20 is transmitting a response to the packet from the external device 6 or the like, step S23 is determined as YES and the process proceeds to step S30. Meanwhile, if step S23 is determined as NO, the main CPU 20 determines whether or not an unprocessed packet has been stored in the SDRAM 100 (step S24). If the determination in step S24 is YES, the main CPU 20 performs a process on the unprocessed packet (step S26) and the process returns to step S21. The processing of step S26 includes the processing of step S14 through step S16. Additionally, the packet to be processed in step S26 includes both the packet, which is received while the main CPU 20 is in the non-sleep state and is stored in the SDRAM 100, and the specified packet, which is received while the main CPU 20 is in the sleep state and is stored in the SRAM 60. Here, the specified packet is moved from the SRAM 60 to the SDRAM 100 by the processing of step S72 shown in FIG. 6. Further, if the specified packet is a packet (e.g. the printing packet) that is to be processed when the printer 10 is in the processing state 302, the main CPU 20 returns the counted value of the timer 50 to its initial value. As a result, step S21 is determined as NO and the printer 10 transitions into the processing state 302.

If the determination in step S24 is NO, the main CPU 20 determines whether or not there is a device (e.g. an external device 6) that is being connected to the printer 10 (step S28). For example, when the printer 10 has a function of a web server and the external device 6 is being TCP-connected to the web server of the printer 10, step S28 is determined as YES. If the determination in step S23 or step S28 is YES, although the MAC controller 72 is performing a process for packet transmission or TCP connection, since the main CPU 20 does not perform the process for packet transmission or TCP connection, the main CPU 20 performs a WAIT instruction (step S30). When the WAIT instruction is executed, the main CPU 20 transitions into an interrupted state and stands-by until the interrupt-request signal is supplied. Then, the main CPU 20 may have lowered power consumption. When the interrupt-request signal is supplied, the main CPU 20 returns to step S221. Meanwhile, the main CPU 20 receives the interrupt-request signal from the MAC controller 72 at an end time of the packet transmission or upon termination of the TCP connection.

In step S32, the main CPU 20 switches a RAM from the SDRAM 100 to the SRAM 60 for storing a packet received via the LAN 4. Further, in step S32, the main CPU 20 also stores the information (e.g. an IP address, a MAC address, and a node name of the printer 10) that is required for the sub CPU 30 to perform the response process instead of the main CPU 20, in the SRAM 60. Then, the main CPU 20 masks (blocks) any interrupt request from other than the sub CPU 30 (step S34). Subsequently, the main CPU 20 supplies a starting interrupt-request signal to start the process to the sub CPU 30 via the sub interrupt controller 38 (step S36).

As described above, the main CPU 20 updates the address 66 of the OID Table 62 stored in SRAM 60 according to MIB object data table stored in SDRAM 100. Then, the main CPU 20 executes the WAIT instruction (step S38). When the WAIT instruction is executed, the main CPU 20 transitions into an interrupted state in which it stands-by until the interrupt-request signal is supplied. The main CPU 20 proceeds to step S40 when the interrupt-request signal is supplied from the sub CPU 30 in step S38 (See step S76 of FIG. 6 to be described later). In step S40, the main CPU 20 moves the specified packet (i.e. the unprocessed packet received during the D sleep state 308) stored in the SRAM 60 to the SDRAM 100. Then, the main CPU 20 cancel the masks in the processing of step S34 (step S42) and returns to step S21.

(Process Performed by the Sub CPU)

The contents of the process performed by the sub CPU 30 will be described. The process of FIG. 6 starts when the printer 10 is turned ON. The sub CPU 30 performs a following process according to the respective programs 84, 88 stored in the flash memory 80 and the determination program 68 stored in the SRAM 60. Specifically, the sub CPU 30 performs the processes of step S52 through step S56 and step S66 through step S76 according to the basic program 84. The sub CPU 30 performs the processes of step S58 through step S62 according to the determination program 68, and performs the processing of step S64 according to the verification program 86.

When the printer 10 is turned ON, the sub CPU 30 executes the WAIT instruction and stands-by until the interrupt-request signal is supplied (step S52). As described before, the main CPU 20 supplies the starting interrupt-request signal to the sub CPU 30 in step S36. In this case, step S52 is determined as YES. If the determination in step S52 is YES, the sub CPU 30 instructions the main clock-circuit 28 (See FIG. 1) to interrupt supplying a clock (step S54). As a result, the main CPU 20 transitions from the non-sleep state into the sleep state. Subsequently, the sub CPU 30 causes the SDRAM 100 to transition from the normal operation mode into the self-refresh mode (step S56). As a result, the printer 10 transitions into the D sleep state 308. Additionally, while the SDRAM 100 is being in the self-refresh mode, the packet received by the printer 10 cannot be stored in the SDRAM 100. Subsequently, the sub CPU 30 monitors receiving the packet (step S58). Specifically, the sub CPU 30 monitors that the packet interrupt-request signal is supplied from the MAC controller 72 via the sub interrupt controller 38.

When the packet interrupt-request signal is supplied from the MAC controller 72, the sub CPU 30 stores the received packet in the SRAM 60. The determination unit 32 performs a packet determination process (See FIGS. 7 to 9) according to the determination program 68 stored in the SRAM 60 (step S60). Subsequently, the sub CPU 30 determines whether or not an operation indication parameter stored in the SRAM 60 is "0" (step S62). As described in detail later, in the packet determination processing of step S60, if the packet received in step S58 is determined as a packet of which the printer 10 should not perform the response process, the operation indication parameter becomes "0" in step S60. Meanwhile, the operation indication parameter is a parameter that indicates whether or not the packet received in step S58 is to performed the response process (i.e. the packet is to be discarded). In case that the packet received in step S58 is a packet of which the response process is to be performed (i.e. the packet is not to be discarded), the operation indication parameter is a parameter that indicates whether the packet is to be processed by the main CPU 20, or the packet is to be processed by the sub CPU 30. If the determination in step S62 is YES, the sub CPU 30 discards the packet received in step S58 and returns to step S58. If the determination in step S62 is NO, the verification unit 34 performs a packet-validity-verification process (see FIG. 10) according to the verification program 86 stored in the flash memory 80 (step S64). Subsequently, the sub CPU 30 determines whether or not the operation indication parameter stored in the SRAM 60 is "0" (step S66). As described in detail later, in the verification process of step S64, if the packet received in step S58 is not verified as valid (normal), the operation indication parameter becomes "0" in step S64. If the determination in step S66 is YES, the sub CPU 30 discards the packet received in step S58 and returns to step S58.

If the determination in step S66 is NO, the sub CPU 30 determines whether or not the operation indication parameter stored in the SRAM 60 is "3" (step S68). As described in detail later, if the operation indication parameter is "3", the packet determination process of step S60 determines that the packet received in step S58 is a packet that is to be processed with the response process by the main CPU 20. If the determination in step S68 is NO, the first responding unit 36 of the sub CPU 30 performs the response process on the packet received in step S58 according to the operation indication parameter (step S70).

In step S72, the sub CPU 30 performs a mode-transition process on the SDRAM 100. The mode-transition process includes a transition process to transition the SDRAM 100 from the self-refresh mode to the normal operation mode, and a processing of switching the RAM from the SRAM 60 to the SDRAM 100 storing the packet received via the LAN 4. Subsequently, the sub CPU 30 instructions the main clock-circuit 26 (See FIG. 1) to start supplying clock to the main CPU 20 (step S74). As a result, the main CPU is supplied with clock and is transitioned from the sleep state to the non-sleep state. The sub CPU 30 supplies the start interrupt-request signal to the main CPU 20 via the main interrupt controller 26 (step S76). As a result, the WAIT instruction of step S38 shown in FIG. 5 is canceled, and the main CPU 20 starts the processing of step S40.

(Packet-Determination Process Performed By the Sub CPU)

Figure 7:
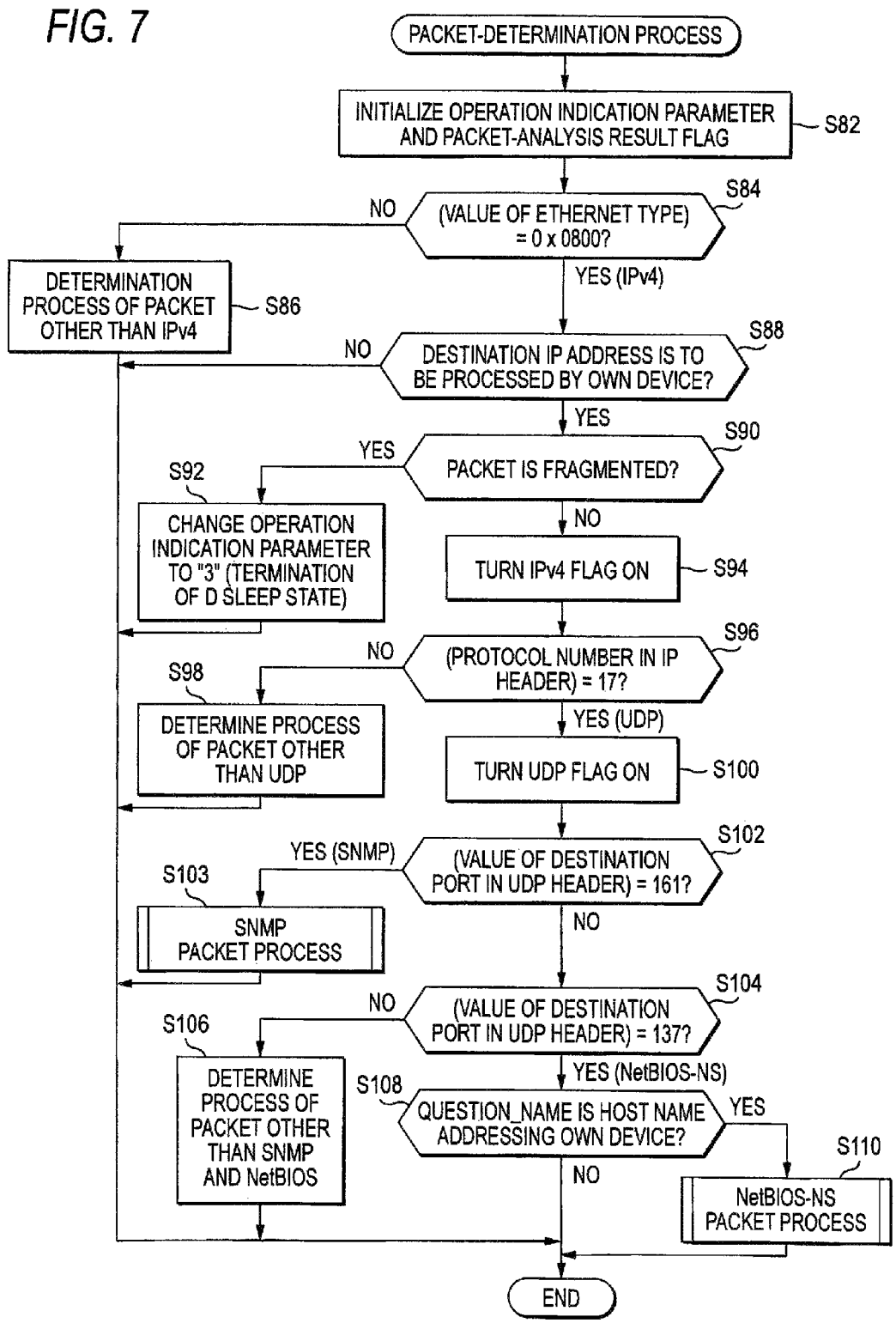
FIG. 7 is a view showing a flow chart of a packet-determination process.

Subsequently, the packet-determination process of step S60 shown in FIG. 6 will be described. As shown in FIG. 7, the determination unit 32 make the operation indication parameter stored in the SRAM 60 to "0" and a packet-analysis result flag (i.e. an IPv4 flag and an UDP flag) to OFF (step S82). Meanwhile, the IPv4 flag is a flag that indicates whether or not a header that is to be processed on the transport layer is the UDP header. Subsequently, the determination unit 32 determines whether or not the Ethernet (registered trademark) type included in the type/frame length 212 in the Ethernet (registered trademark) header 210 (See FIG. 4) is "033 0800" (step S84). If the Ethernet type is "0x0800", the header that is to be processed on the internet layer is the IPv4 header. Here, if the determination is YES, the process proceeds to step S88, and if the determination is NO, the process proceeds to step S86. In the step S86, the determination unit 32 performs the packet-determination process according to the kinds of headers that is to be processed on the internet layer and terminates the packet-determination process. For example, if the Ethernet (registered trademark) type is "0x0806", the determination unit 32 performs the packet-determination process in which the header that is to be processed on the internet layer is an Address Resolution Protocol (ARP) header in step S86.

In step S88, the determination unit 32 determines whether or not the destination IP address 228 in the IPv4 header 220 is an IP address of a packet that is to be processed by the printer 10. Specifically, if the destination IP address 228 is any one of the above three kinds of IP addresses, the determination unit 32 determines that the packet is a packet that is to be processed by the printer 10, and if not, the packet is not a packet that is to be processed by the printer 10. Here, if the determination is YES, the process proceeds to step S90, and if the determination is NO, the packet-determination process is terminated. In step S90, the determination unit 32 determines whether or not the packet is fragmented packets using a fragment offset 224 and a flag 229 in the IPv4 header 220. Specifically, the determination unit 32 determines whether or not the values of the fragment offset 224 and the flag 229 are "0", and if any one of values of the fragment offset 224 and the flag 229 is not "0", the determination unit 32 determines that the packet is a fragmented packet (YES in step S90). Here, if the determination is YES, the process proceeds to step S92, and if the determination is NO, the process proceeds to step S94. In step S92, the determination unit 32 changes the operation indication parameter to "3" that means the termination of the D sleep state 302, and the packet-determination process is terminated. Because the response process to the fragmented packet is complicated, it is preferred that the main CPU 20 perform the response process.

In step S94, the determination unit 32 turns the IPv4 flag into ON. Then, the determination unit 32 determines whether or not a value of a protocol number 225 in the IPv4 header 220 is "17" (step S96). A case where the value of the protocol number 225 is "17" indicates the header that is to be processed on the transport layer is an UDP header. Here, if the determination is YES, the process proceeds to step S100, and if the determination is NO, the process proceeds to step S98. In step S98, the determination unit 32 performs the packet-determination process according to the kinds of the headers that is to be processed on the transport layer and terminates the packet-determination process. For example, if the protocol number is "6", in step S98, the determination unit 32 performs the packet-determination process, in which the header that is to be processed on the transport layer is a TCP header.

In step S100, the determination unit 32 turns the UDP flag into ON. Subsequently, the determination unit 32 determines whether or not the value of the destination port 232 in the UDP header 230 is "161" (step S102). A case where the value of the destination port 232 is "161" indicates that the application data 240 that is to be processed on the application layer is a SNMP data. Here, if the determination is YES, the process proceeds to step S103, and if the determination is NO, the process proceeds to step S104. In step S103, the determination unit 32 performs an SNMP packet process. In step S104, the determination unit determines whether or not the value of the destination port 232 in the UDP header 230 is "137". A case where the value of the destination port 232 is "137" indicates that the application data 240 is a NetBIOS-NS data. Here, if the determination is YES, the process proceeds to step S108, and if the determination is NO, the process proceeds to step S106. In step S106, the determination unit 32 performs a packet-determination process according to the kinds of the application data 240 and terminates the packet-determination process. For example, if the value of the destination port 232 is "138", the determination unit 32 performs a packet-determination process in which the application data 240 is a NetBIOS Datagram service, in step S106. Meanwhile, in step S106, if the value of the destination port 232 is a port number that is not supported by the printer 10, the determination unit 32 determines that the received packet is not a packet that is to be processed by the printer 10, and terminates the packet-determination process.

In step S108, the determination unit 32 determines whether or not a QUESTION-NAME 246 in the application data 240 is a host name addressing the printer 10. Here, if the determination is YES, the determination unit 32 performs a NetBIOS-NS packet process (step S110). Meanwhile, if the determination is NO, the determination unit 32 determines that the packet received in step S58 is not a packet that is to be processed by the printer 10, and terminates the packet-determination process. Additionally, in step S88, step S106 or step S108, if the packet received in step S58 shown in FIG. 6 is determined as a packet that is not be processed by the printer 10, the operation indication parameter is "0". In this case, step S62 of FIG. 6 determines YES, and the packet-validity-verification processing of step S64 is not performed.

(SNMP Packet Process)

Figure 8:
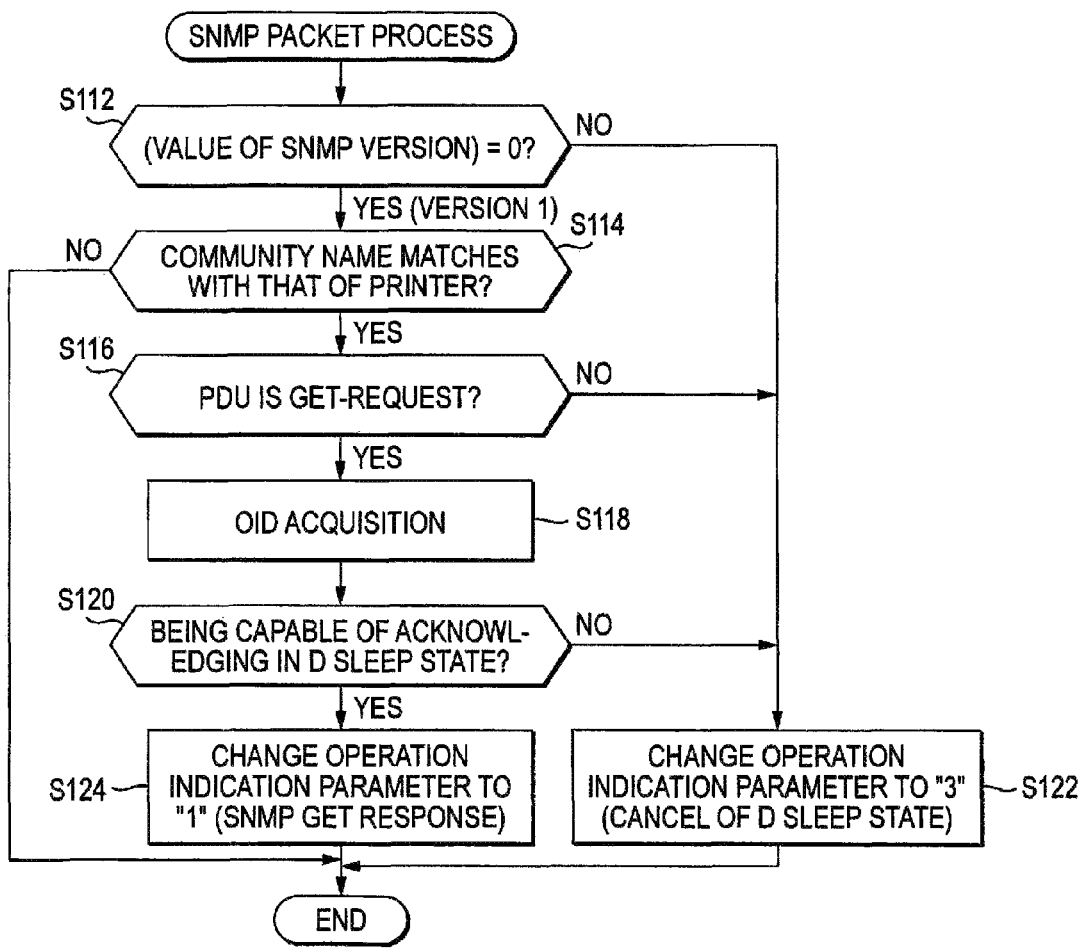
FIG. 8 is a view showing a flow chart of an SNMP packet process.

Subsequently, the SNMP packet process that is performed in step S103 will be described. As shown in FIG. 8, the determination unit 32 determines whether or not the value of an SNMP version 251 (See FIG. 4) in the application data 240 is "0" (i.e. SNMPv1) (step S112). Here, if the determination is YES, the process proceeds to step S114, and if the determination is NO, the process proceeds to step S122. In step S114, the determination unit 32 determines whether or not a community name 252 (See FIG. 4) matches with the community name of the printer 10. Here, if the determination is YES, the process proceeds to step S116, and if the determination is NO, the SNMP packet process is terminated. If the community name 252 does not match with the community name of the printer 10, the response process is not to be performed on the packet received in step S58 shown in FIG. 6. In step S116, the determination unit 32 determines whether or not the PDU type 254 (See FIG. 4) is a Get-Request. Here, if the determination is YES, the process proceeds to step S118, and if the determination is NO, the process proceeds to step S122.

In step S118, the determination unit 32 acquires 1st through N-th OIDs (N is an integer that is equal to or more than 1) included in the object data 256 (See FIG. 4). Subsequently, the determination unit 32 determines whether or not it is possible to perform the response process on the packet received in step S58 shown in FIG. 6 while the printer 10 is maintained in the D sleep state 308 (that is, while the main CPU 20 is maintained in the sleep state) (step S120). Specifically, the determination unit 32 determines whether or not the OIDs 64 that match with the respective one or more OIDs acquired in step S118 have been registered in the OID Table 62. If the determination unit 32 determines that all of one or more OIDs acquired in step S118 have been registered in the OID Table 62, the determination in step S120 is YES. Meanwhile, if the OID that matches with at least one OIDs of one or more OIDs acquired in step S118 has not been registered in the OID Table 62, the determination unit 32 determines that the determination in step S120 is NO, because the sub CPU 30 cannot perform the response process on the packet received in step S58. If the determination in step S120 is YES, the process proceeds to step S124, and if the determination is NO, the process proceeds to step S122.

In step S122, the determination unit 32 changes the operation indication parameter to "3" (indicating the cancel of the D sleep state) and terminates the SNMP packet process. That is, if the results of step S112, step S116, and step S120 are NO, the determination unit 32 determines that perform the response process is to be performed on the packet received in step S58. As a result, through the processes of step S64 and step S66 shown in FIG. 6, the main CPU 20 transitions from the sleep state into the non-sleep state (See step S100 in FIG. 6). In step S124, the determination unit 32 changes the operation indication parameter to "1" (indicating SNMP-GET response), and terminates the SNMP packet process. If the operation indication parameter is "1", in step S70 in FIG. 6, the first responding unit 36 acquires addresses corresponding to the OIDs acquired in step S118 from the OID Table 62, as the response process to a Get-Request packet. Subsequently, the first responding unit 36 acquires the object data that correspond to the acquired addresses, from the MIB data storage area 90 stored in the flash memory 80. Then, the first responding unit 36 transmits a response packet in which the OIDs and the acquired object data are corresponded, to a source device of the Get-Request packet.

(NetBIOS-NS Packet Process)

Figure 9:
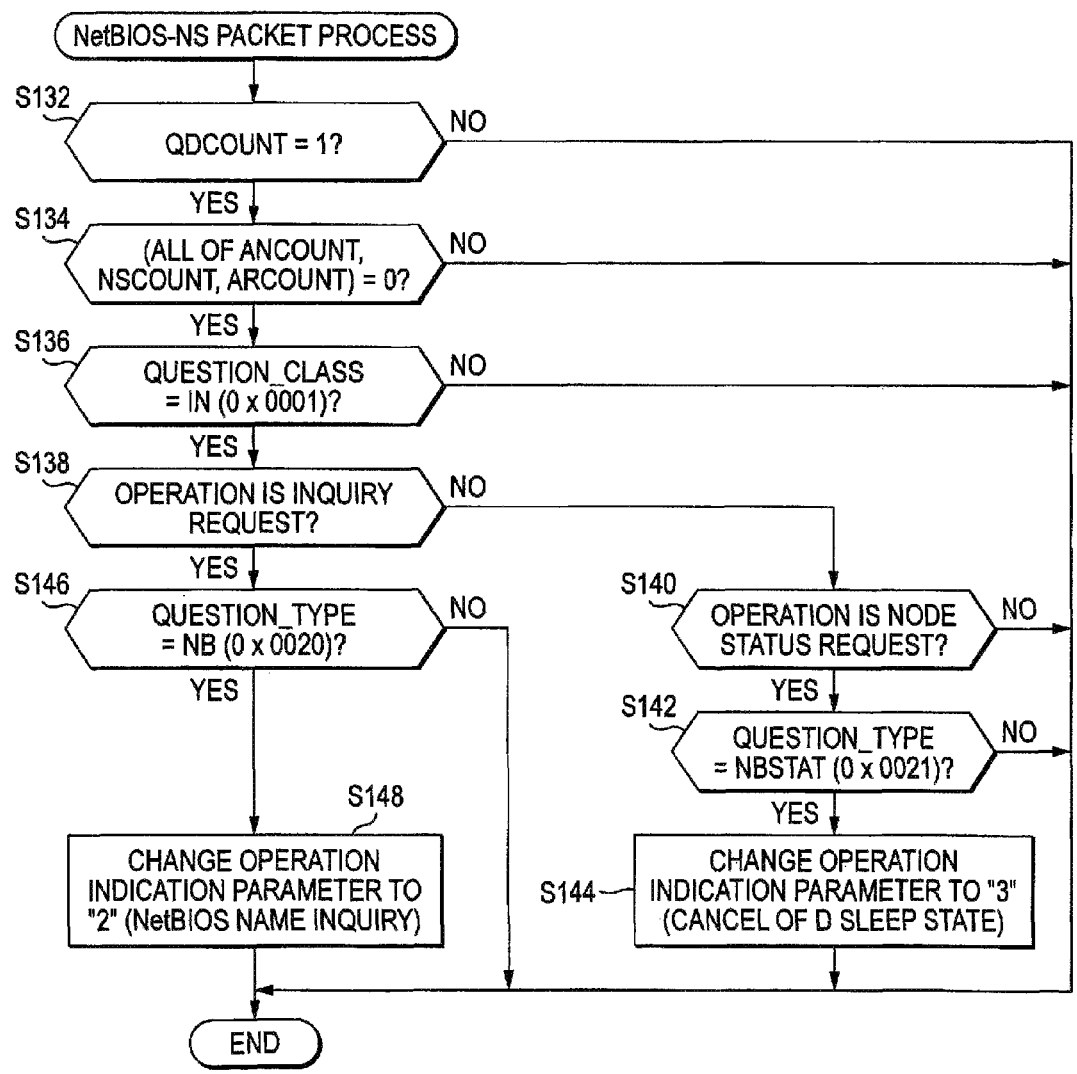
FIG. 9 is a view showing a flow chart of a NetBIOS-NS packet process.

Subsequently, the NetBIOS-NS packet process of step S110 shown in FIG. 7 will be described. As shown in FIG. 9, the determination unit 32 determines whether or not the value of QDCOUNT 241 (See FIG. 4) in the application data 240 is "1" (step S132). Meanwhile, the packet in which the value of QDCOUNT 241 is other than "1" is a packet that is not to be performed by the response process.

Here, if the determination is YES, the process proceeds to step S134, and if the determination is NO, the process is terminated.

In step S134, the determination unit 32 determines whether or not all the values of ANCOUNT 242, NSCOUNT 243, and ARCOUNT 245 (See FIG. 4) are "0". Meanwhile, the packet in which at least one value of the respective information 242, 243, and 245 is not "0" is a packet that is not to be performed by the response process. Here, if the determination is YES, the process proceeds to step S136, and if the determination is NO, the process is terminated. In step S136, the determination unit 32 determines name whether or not the value of QUESTION_CLASS 248 in the application data 240 of the packet received in step S58 shown in FIG. 6 is IN(0x0001). The packet in which the value of QUESTION_CLASS 248 is other than IN(0x0001) is a packet that is not to be performed by the response process. Here, if the determination is YES, the process proceeds to step S138, and if the determination is NO, the process is terminated. In step S138, the determination unit 32 determines whether or not the operation 249 (OPCODE, NM_FLAGS and RCODE) in the application data 240 of the packet received in step S58 shown in FIG. 6 has a value indicating a name inquiry request. Here, if the determination is YES, the process proceeds to step S146, and if the determination is NO, the process proceeds to step S140.

In step S140, the determination unit 32 determines whether or not the operation 249 has a value indicating a status request of the printer 10. Meanwhile, the packet in which the operation 249 is other than the values indicating the name inquiry request and the status request is a packet that is not to be performed by the response process. Here, if the determination is YES, the process proceeds to step S142, and if the determination is NO, the process is terminated. In step S142, the determination unit 32 determines whether or not the value of QUESTION_TYPE 247 in the application data 240 of the packet received in step S58 shown in FIG. 6 is NBSTAT (0x0021).

The packet in which the value of QUESTION_TYPE 247 is not NBSTAT(0x0021) is a packet that is to be performed by the response process.

Here, if the determination is YES, the process proceeds to step S144, and if the determination is NO, the process is terminated.

In step S144, the determination unit 32 changes the operation indication parameter to "3" (indicating the termination of the D sleep state) and terminates the process.

In step S146, the determination unit determines whether or not the value of QUESTION_TYPE 247 is NB(0x0020). The packet in which the value of QUESTION_TYPE 247 is other than NB(0x0020) is a packet that is not to be performed by the response process. Here, if the determination is YES, the process proceeds to step S148, and if the determination is NO, the process is terminated. In step S148, the determination unit changes the operation indication parameter to "2" (indicating NetBIOS name inquiry) and terminates the process. If the operation indication parameter is "2", in step S70 in FIG. 6, the first responding unit 36 performs the response process on the packet in which QUESTION_TYPE 247 is NB(0x0020).

In the NetBIOS-NS packet process, if the process is terminated while the operation indication parameter is maintained to "0" without changing, that is, if the results of step S132 trough step S136, step S140, step S142, and step S146 are NO, step S66 in FIG. 6 is determined as YES, and the sub CPU 30 and the main CPU 20 do not perform the response process.

(Packet-Validity-Verification Process)

Figure 10:
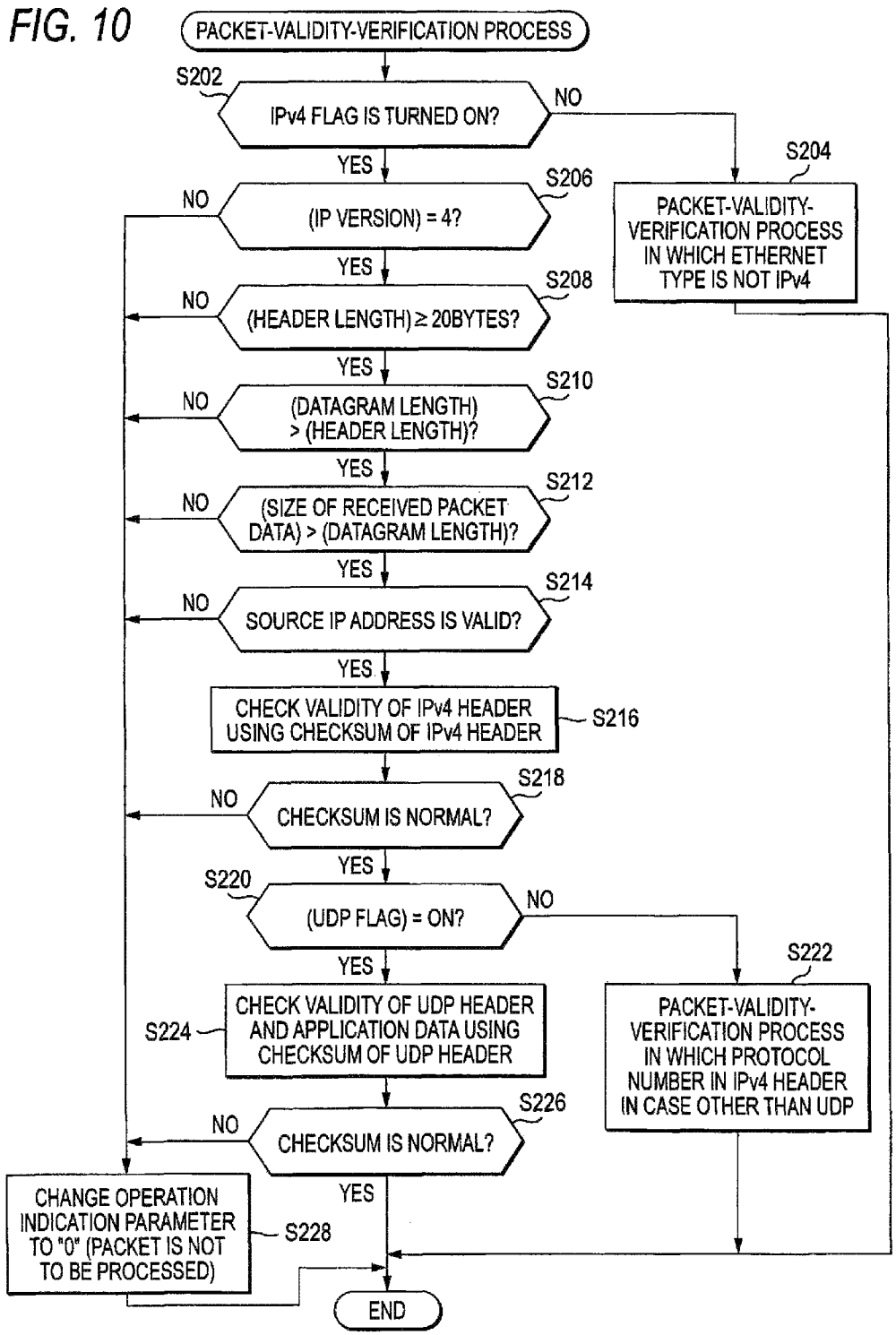
FIG. 10 is a view showing a flow chart of a verification process for the validity of a packet.

The packet-validity-verification process of step S64 shown in FIG. 6 will be described. As shown in FIG. 10, the verification unit 34 (See FIG. 1) verifies whether or not the IPv4 flag stored in the SRAM 60 is in an ON state (step S202). Here, if the determination is YES, the process proceeds to step S206, and if the determination is NO, the process proceeds to step S204. In step S204, the verification unit 34 performs a packet-validity-verification process when the Ethernet (registered trademark) type of the type/frame length 212 of the Ethernet (registered trademark) header 210 is other than IPv4.

In step S206, the verification unit 34 verifies whether or not the value of the IP version 221 (See FIG. 4) in the IPv4 header 220 is "4" (indicating the IPv4). That is, even when IPv4 flag is turned ON (that is, step S84 of FIG. 7 determines that the Ethernet (registered trademark) type indicates the IPv4), the verification unit 34 verifies whether or not the packet is a packet in which the value of the IP version 221 does not indicate the IPv4. If IPv4 flag is in the ON state and the value of the IP version 221 is not a value that indicates the IPv4, the packet has no validity, and thus the packet is not normal. Here, if the determination is YES, the process proceeds to step S208, and if the determination is NO, the process proceeds to step S228.

In step S208, the verification unit 34 verifies whether or not the header length 222 (See FIG. 4) is more than 20 bytes. The header length indicates a header length of the IPv4 header 200. If the IPv4 header 200 includes essential information, the header length becomes more than 20 bytes. That is, if the header length is less than 20 bytes, the IPv4 header does not include the essential information, so that the packet is not the normal packet. Here, if the determination is YES, the process proceeds to step S210, and if the determination is NO, the process proceeds to step S228. In step S210, the verification unit 34 verifies whether or not the datagram length 223 (See FIG. 4) is longer than the header length 222. The datagram length 223 indicates the total size of the respective headers 220 and 230 and the application data 240. If a packet is a normal packet, the datagram length 223 is longer than the header length of the IPv4 header 200. Here, if the determination is YES, the process proceeds to step S212, and if the determination is NO, the process proceeds to step S228.

In step S212, the verification unit 34 verifies whether or not the size of the packet received in step S58 shown in FIG. 6 is longer than the datagram length 223. The sub CPU 30 measures the size of the packet and stores the measured size in the SRAM 60 at the receiving packet. The packet size is the total size from the Ethernet (registered trademark) header 210 to the application data 240. If the packet is a normal packet, the size of the packet is longer than the datagram length 223. Here, if the determination is YES, the process proceeds to step S214, and if the determination is NO, the process proceeds to step S228.

In step S214, the verification unit 34 verifies whether or not the source IP address 227 (See FIG. 4) is valid. Specifically, if the source IP address 227 is an IP address of class D (the most significant 4-bit of the IP address is "1110"), or an IP address of class E (the most significant 4-bit of the IP address is "1111"), the verification unit 34 determines as NO in the determination in step S214. Further, the verification unit determines that if the source IP address 227 is an IP address (So called a loop back address) used in communication in a device or a broadcast address, the determination in step S214 is NO. This is because these IP addresses are not an IP address that is used for communication with other device. The verification unit 34 also determines that if the source IP address 227 is an IP address that is predetermined in the printer 10 as an IP address that is to be ignored, the determination in step S214 is NO. If the source IP address is an address other than the above IP addresses, the determination in step S214 is determined to be YES. Here, if the determination is YES, the process proceeds to step S216, and if the determination is NO, the process proceeds to step S228.

In step S216, the verification unit 34 verifies the validity of the IPv4 header using checksum of the IPv4 header 220. For example, the verification unit 34 calculates the checksum of the IPv4 header 220 using a predetermined equation. The verification unit 34 verifies whether or not the calculated checksum matches with the header checksum 226 in the IPv4 header 220 (step S218). If the determination is mismatched, it means that the packet received in step S58 shown in FIG. 6 is not normal. Here, if the determination is YES, the process proceeds to step S220, and if the determination is NO, the process proceeds to step S228.

In step S220, the verification unit 34 verifies whether or not the UDP flag in the SRAM 60 is turned ON. Here, if the determination is YES (i.e. if the header that is to be processed on the transport layer is the UDP header 230), the process proceeds to step S224, and if the determination is NO, the process proceeds to step S222. In step S222, the verification unit 34 performs a packet-validity-verification process when the protocol number 225 in the IPv4 header 220 corresponds to a value other than the UDP.

In step S224, the verification unit 34 verifies the validity of data including the UDP header and the application data, using the checksum of the UDP header 230. For example, the verification unit 34 calculates the checksum of the portion including the UDP header 230 and the application data 240 using a predetermined equation. Then, the verification unit 34 verifies whether or not the calculated checksum matches with the checksum in the UDP header 230 (step S226). If the determination is mismatched, it means that the packet received in step S58 shown in FIG. 6 is not normal. Here, if the determination is YES, the verification unit terminates the packet-validity-verification process, and if the determination is NO, the process proceeds to step S228. In step S228, the verification unit 34 changes the operation indication parameter into "0" and terminates the process. As a result, the determination in step S66 shown in FIG. 6 is determined as NO, and the sub CPU 30 and the main CPU 20 do not perform the response process on the packet received in step S58 shown in FIG. 6.

In the described aspect, when the packet received in step S58 of FIG. 6 is the packet of the SNMP, the destination IP address 228 in the IPv4 header 220 and the destination port 232 in the UDP header 230, etc., are used in step S60 that is packet-determination process (FIG. 7) shown in FIG. 6. In the subsequent step S64 of packet-validity-verification process (FIG. 10) of FIG. 6, the header checksum 226 in the IPv4 header 220, the checksum 234 in the UDP header 230, etc. are used. That is, in the described aspect, after the packet determination process using the destination port 232 in the UDP header 230 that is to be processed in the upper layer (transport layer), the packet-validity-verification process is performed using the header checksum 226 in the IPv4 header 220 that is to be processed in the lower layer (internet layer).

Further, when the packet received in step S58 of FIG. 6 is the packet of the NetBIOS-NS, the destination IP address 228 in the IPv4 header 220, the destination port 232 in the UDP header 230, and the QUESTION_NAME 246 in the application data 240, etc. are used in step S60 that is the packet-determination process (FIG. 7) shown in FIG. 6.

Subsequently, in step S64 that is packet-validity-verification process (FIG. 10) shown in FIG. 6, the header checksum 226 in the IPv4 header 220, the checksum 234 in the UDP header 230, etc. are used.

That is, in the described aspect, after the determination process using the QUESTION_NAME 246 in the application data 240 that is to be processed in the upper layer (application layer), the packet-validity-verification process is performed using the header checksum 226 in the IPv4 header 220 and the checksum 234 in the UDP header 230 that is to be processed in the lower layers (internet layer and transport layer). Further, in the described aspect, after the packet determination process using the destination port 232 in the UDP header 230 that is to be processed in the upper layer (transport layer), the packet-validity-verification process is performed using the header checksum 226 in the IPv4 header 220 that is to be processed in the lower layer (internet layer).

The printer 10 of the aspect has been described in detail. Generally, when a packet is received, a processing determines whether or not the received packet is a packet that is to be performed by the response process, and at the same time, a processing verifies whether or not the packet is valid (See step S14 of FIG. 5). As a result, in the packet-determination process, even when it is determined that the printer 10 is not required to perform the response process, the packet-validity-verification process is performed. In contrast, the sub CPU 30 of the printer 10 in this aspect performs the packet-determination process (See FIG. 7) when the main CPU 20 receives the packet in the sleep state (See step S58 of FIG. 6). If the received packet is determined as a packet of which the response process is to be performed by the printer 10 (NO in step S62 of FIG. 6), the packet-validity-verification process (See FIG. 10) is performed. In the packet-determination process, if the received packet is determined not to be the packet of which the response process is to be performed by the printer 10 (YES in step S62 of FIG. 6), the sub CPU 30 does not perform the packet-validity-verification process.

As a result, the processing load of the present aspect of the case, where only the packet-determination process is performed, is reduced compared to that of the case, where the determination process and the verification process are performed in the general processing order. For this reason, power consumption of the printer 10 can be reduced while the main CPU 20 is in the sleep state.

When a packet is received while the main CPU 20 is in the sleep state (See step S58 of FIG. 6), the sub CPU 30 performs the packet determination process (See FIG. 7) of step S60 shown in FIG. 6 using the destination IP address 228 in the IPv4 header 220, the destination port 232 in the UDP header 230, the QUESTION_NAME 246 in the application data 240, and so on. In the packet-determination process, if the received packet is determined not to be a packet of which the response process is to be performed by the printer 10 (YES in step S62 of FIG. 6), the packet-validity-verification process (See step S64 of FIG. 6 and FIG. 10) is performed using the header checksum 226 in the IPv4 header 220, the checksum 234 in the UDP header 230, and so on.

For this reason, if the received packet is determined not to be a packet that is to be acknowledged in the packet determination process using the destination port 232 in the UDP header 230 that is to be processed in the upper layer (transport layer), the sub CPU 30 may not perform the packet-validity-verification process using the header checksum 226 in the IPv4 header 220 that is to be processed in the lower layer (internet layer).

For example, if the sub CPU 30 employs the configuration that, in order of the header (information) to be processed in the lower layer, performs the determination process for determining whether or not the packet is a packet that is to be performed by the response process and the verification process for verifying whether or not the packet is valid, when the QUESTION_NAME 246 in the application data 240 is not a host name addressing the printer 10, the sub CPU 30 cannot determine that the packet is not a packet that is to be performed by the response process only after performing the determination process and the verification process using the IPv4 header 220 and the UDP header 230. In contrast, the printer 10 may not perform the packet-validity-verification process. Accordingly, it is possible to reduce the processing load of the sub CPU 30. As a result, a power consumption of the printer 10 can be lowered.

Generally, few packets are verified as invalid in the packet-validity-verification process (See FIG. 10). Accordingly, for example, when it is employed the configuration that first performs the packet-validity-verification process and then performs the packet determination process, the packet-validity-verification process is performed even on the packet determined, in the packet determination process, as a packet that is not to be performed by the response process. In this case, the processing load of the sub CPU 30 is increased. As a result, power consumption of the printer is increased. In contrast, in the present aspect, the packet-validity-verification process is not performed on the packet that is determined, in the packet determination process, as the packet that is not to be performed by the response process. In this case, the processing load of the sub CPU 30 is reduced. As a result, power consumption of the printer can be reduced.

The sub CPU 30 determines whether or not to transition the main CPU 20 from the sleep state into the non-sleep state in the packet-determination process (See FIG. 7), the step SNAP packet process (See FIG. 8), and the NetBIOS-NS packet process (See FIG. 9) (See step S90 of FIG. 7, step S112 and step S120 of FIG. 8, and step S142 of FIG. 9).

According to this configuration, when the packet is a packet of which the response process is to be performed by the sub CPU 30, the sub CPU 30 can maintain the main CPU 20 in the sleep state by performing the response process of the packet. Thus, a power consumption of the printer 10 can be lowered. Meanwhile, when the packet is a packet of which the response process is to be performed by the main CPU 20, the main CPU 20 is transitioned from the sleep state into the non-sleep state, and the response process of the packet is performed by the main CPU 20. Thus, the response process of the packet can be appropriately performed.

The determination program 68 for the determination process by the sub CPU 30 performing the packet-determination process (See FIG. 7) is used in the sub CPU 30 while it is being stored in the SRAM 60. In contrast, the verification program 86 for the verification process by the sub CPU 30 performing the packet-validity-verification process (See FIG. 10) is used in the sub CPU 30 while it is being stored in the flash memory 80. According to this configuration, it is possible to reduce the capacity of the SRAM 60 in the ASIC 12. Further, it is possible to reduce the frequency of access to the flash memory 80 outside of the ASIC 12 by the sub CPU 30.

Further, the OID table 62 is stored in the SRAM 60, but object data itself is not stored therein. This configuration can reduce the capacity of the SRAM 60, compared to the configuration where the object data is stored in the SRAM 60.

Meanwhile, the printer 10 is an example of the "communication apparatus." Further, the main CPU 20 is an example of the "first processing unit," and the sub CPU 30 is an example of the "second processing unit." The state that both the main CPU 20 and the sub CPU 30 are in the non-sleep state is an example of the "first state," and the state where the main CPU 20 is in the sleep state and the sub CPU 30 are in the non-sleep state is an example of the "second state." The process in FIG. 7 is an example of the "first determination process," and the process in FIG. 10 is an example of the "first verification process."

The SRAM 60 is an example of the "first memory," and the flash memory 80 is an example of the "second memory." The program 68 for the determination process is an example of the "first program," and the program 86 for the verification process is an example of the "second program."

(Modifications)

(1) In the described aspect, the printer 10 includes the main CPU 20 and the sub CPU 30. Instead of this configuration, the printer 10 may include only the main CPU 20. In this case, the frequency of the clock signal transmitted to the main CPU 20 may be transitioned between a low state and a high state. In the state that the frequency of the clock signal is high, power consumption of the main CPU 20 is relatively high. In the state that the frequency of the clock signal is low, a power consumption of the main CPU 20 is relatively low. When the printer 10 is in each of the states 302 to 306, the frequency of the clock signal transmitted to the main CPU 20 may be in the high state. When the printer 10 is in the D sleep state 308, the frequency of the clock signal transmitted to the main CPU 20 may be in the low state. In this case, instead of the sub CPU 30 of the described aspect, the main CPU 20 may perform the processes (processes of FIGS. 6 to 10) which are performed by the sub CPU 30. In this modification, the main CPU 20 is an example of the "processing unit," and the state that the frequency of the clock signal transmitted to the main CPU 20 is high is an example of the "first state." The state that the frequency of the clock signal transmitted to the main CPU 20 is low is an example of the "second state."

(2) In the described aspect, the basic program 84 and the verification program 86 for the verification process are stored in the flash memory 80 in the state that each of the CPUs 20 and 30 can use them. However, each of the programs 84 and 86 may be stored in the flash memory 80 in a compressed state. In this case, the main CPU 20 or the sub CPU 30 may decompress each of the programs 84 and 86 when the printer 10 is powered on or when the programs are started, and may store it in the SDRAM 100 or the SRAM 60.

(3) In the described aspect, when the value of the QUESTION_TYPE 247 in the application data 240 is NBSTAT (0x0021) (YES in step S142 of FIG. 9), the operation indication parameter is changed to "3" that indicates the termination of the D sleep state. That is, when the value of the QUESTION_TYPE 247 in the application data 240 is NBSTAT (0x0021), the main CPU 20 performs the acknowledge process of the packet received in step S58 shown in FIG. 6. Instead of the configuration, when the value of the QUESTION_TYPE 247 in the application data 240 is NBSTAT (0x0021), the sub CPU 30 may perform the response process of the packet received in step S58 of FIG. 6.

(4) While the aspects have been described with regard to the printer 10, the present invention is applicable to communication apparatuses such as e.g. servers, scanners, multi-function devices, and the like.

What is claimed is:

1. A communication apparatus comprising:
an interface configured to connect to a network;
a first processing unit configured to transition between a first state and a second state in which power consumption is lower than the first state; and
a second processing unit;
wherein, while the first processing unit is in the second state, the second processing unit is configured to:
receive, via the interface, a first packet;
   determine whether a response to the received first packet is required by using first information of the first packet, the first information being processed on a first layer, wherein the first information comprises both a destination IP address included in an IP header of the first packet and a destination port number included in a UDP header of the first packet;
   when it is determined that the response to the received first packet is not required, discard the received first packet; and
   when it is determined that the response to the received first packet is required,
     verify validity of the received first packet by using second information of the first packet, the second information being processed on a second layer that is lower than the first layer, wherein the second information comprises specific information included in the IP header of the first packet, the specific information being at least one of error detecting information, data size information and a source IP address;
     when the first packet is not verified as valid, discard the received first packet; and
     when the first packet is verified as valid,
       determine whether the first packet is to be processed by the first processing unit or by the second processing unit based on a particular operation indication parameter, wherein the particular operation indication parameter is set when determined that the received first packet is a fragmented packet;
       when it is determined that the first packet is to be processed by the second processing unit, generate a first response packet, which includes a first response to the received first packet, and transmit the generated first response packet via the interface; and
       when it is determined that the first packet is to be processed by the first processing unit, provide a particular signal to the first processing unit;
wherein the first processing unit is further configured to:
   receive the particular signal;
   transition from the second state to the first state in response to receiving the particular signal;
   generate a second response packet, which includes a second response to the received first packet; and
   transmit the generated second response packet via the interface.

2. The communication apparatus according to claim 1, wherein the second processing unit determines whether the response is required to the received first packet by using both a destination IP address included in an IP header of the first packet and a destination port number included in an UDP header of the first packet, and
wherein the second processing unit verifies the validity of the received first packet by using specific information included in the IP header of the first packet.

3. The communication apparatus according to claim 2,
wherein the specific information included in the IP header includes at least one of error detecting information, data size information, and a source IP address.

4. The communication apparatus according to claim 3,
wherein second processing unit determines whether the response is required to the received first packet by using information included in application data of the first packet, and
wherein the second processing unit verifies the validity of the received first packet by using specific information included in the UDP header of the first packet after determining whether a response to the received first packet is required.

5. The communication apparatus according to claim 4,
wherein the specific information included in the UDP header includes error detecting information.

6. The communication apparatus according to claim 1,
wherein the second processing unit is further configured to:
verify the validity of the received second packet by using fourth information; and
perform the response on the second packet when the second packet is verified as valid.

7. The communication apparatus according to claim 6,
wherein the second processing unit verifies the validity of the received second packet by using third information, which is processed on a third layer, of the second packet, after that, the second processing unit verifies the validity of the received second packet using fourth information, which is processed on a fourth layer that is upper than the third layer, of the second packet.

8. The communication apparatus according to claim 1, further comprising:
an integrated circuit including the first processing unit and second processing unit;
a first memory provided inside of the integrated circuit; and
a second memory provided outside of the integrated circuit,
wherein the second processing unit determines whether the response to the received first packet is required according to a first program stored in the first memory, and
wherein the second processing unit verifies the validity of the received first packet according to a second program stored in the second memory.

* * * * *